(12) United States Patent
Waskie et al.

(10) Patent No.: US 9,709,120 B1
(45) Date of Patent: Jul. 18, 2017

(54) ENERGY-ABSORBING STRUCTURE

(71) Applicant: GM GLOBAL TECHNOLOGY OPERATIONS LLC, Detroit, MI (US)

(72) Inventors: David B. Waskie, Farmington Hills, MI (US); Jason M. Miller, St. Clair Shores, MI (US); Vijay Shankar Iyer, Bangalore (IN); Scott W. Thorpe, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/088,806

(22) Filed: Apr. 1, 2016

(51) Int. Cl.
*B62D 25/12* (2006.01)
*F16F 7/12* (2006.01)
*B62D 25/10* (2006.01)
*B32B 3/26* (2006.01)

(52) U.S. Cl.
CPC ............. *F16F 7/12* (2013.01); *B32B 3/266* (2013.01); *B62D 25/105* (2013.01); *B62D 25/12* (2013.01); *B32B 2307/56* (2013.01); *B32B 2605/00* (2013.01)

(58) Field of Classification Search
CPC ......... F16F 7/12; B62D 25/12; B62D 25/105; B32B 3/266; B32B 2605/00; B32B 2307/56
See application file for complete search history.

(56) References Cited

U.S. PATENT DOCUMENTS

2015/0028624 A1* 1/2015 Wisniewski ........... B62D 25/12
296/187.03

* cited by examiner

*Primary Examiner* — Glenn Dayoan
*Assistant Examiner* — Melissa A Black
(74) *Attorney, Agent, or Firm* — Quinn IP Law (57) ABSTRACT

An energy-absorbing structure is provided. The energy-absorbing structure includes a first panel member and a second panel member coupled together. The first panel member has a first edge and a second edge opposite the first edge. The second panel member defines a first edge and a second edge opposite the first edge. The second panel member further defines a first deformable wall extending from the first edge thereof and away from the first panel member and a second deformable wall extending from the second edge thereof and away from the first panel member. The first deformable wall defines a first plurality of apertures and the second deformable wall defines a second plurality of apertures. The first and second plurality of apertures may be defined as one of an array of perforations and a plurality of slots. The energy-absorbing structure may be provided as a hood for a motor vehicle.

11 Claims, 5 Drawing Sheets

ENERGY-ABSORBING STRUCTURE

TECHNICAL FIELD

The present invention relates generally to energy-absorbing structures, and more specifically to energy-absorbing vehicle front structures such as energy-absorbing engine compartment hoods for vehicles.

BACKGROUND

Formed structures or objects may be subjected to external forces. If an external force is exerted onto the formed structure, the formed structure may manage the energy of the external force applied thereto. Particularly, a vehicle may at times be subjected to external forces. If an external force is exerted on the vehicle at a particular formed structure, for example, a body panel or hood, the formed structure thereof may manage the energy of the external force applied to the particular formed structure, body panel, or the like, thereby serving as a buffer between an external force and the vehicle engine compartment.

SUMMARY

The present disclosure relates to an energy-absorbing structure. In an example embodiment the energy-absorbing structure includes a first panel member and a second panel member. The first panel member has a first panel first edge and a first panel second edge, such that the first panel second edge is disposed opposite the first panel first edge. The first panel member may be formed of a rigid material.

The second panel member has a second panel first edge and a second panel second edge, such that the second panel second edge is disposed opposite the second panel first edge. The second panel member may be composed of a rigid material.

The second panel member further defines a first deformable wall defined proximate to the second panel first edge. The first deformable wall extends from the second panel first edge. The first deformable wall defines a first plurality of apertures therein. The second panel member further defines a second deformable wall defined proximate to the second panel second edge. The second deformable wall extends from the second panel second edge. The second deformable wall defines a second plurality of apertures therein.

The first panel member and second panel member are configured to be coupled. When the first panel member and the second panel member are coupled, the second panel first edge is aligned with the first panel first edge and the second panel second edge is aligned with the first panel second edge, such that the first deformable wall and the second deformable wall extend away from the first panel member.

The energy-absorbing structure may be incorporated as a portion of a vehicle body, namely as a vehicle hood assembly, such that the energy-absorbing structure can absorb energy from an external force applied to the vehicle body. However, the energy-absorbing structure may also be employed as a stand-alone energy-absorbing structure or as an energy-absorbing structure utilized as a part of another structure within a variety of applications for example, aircraft applications, building construction applications, park or playground equipment, and other applications in which an energy-absorbing structure would be desirable.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
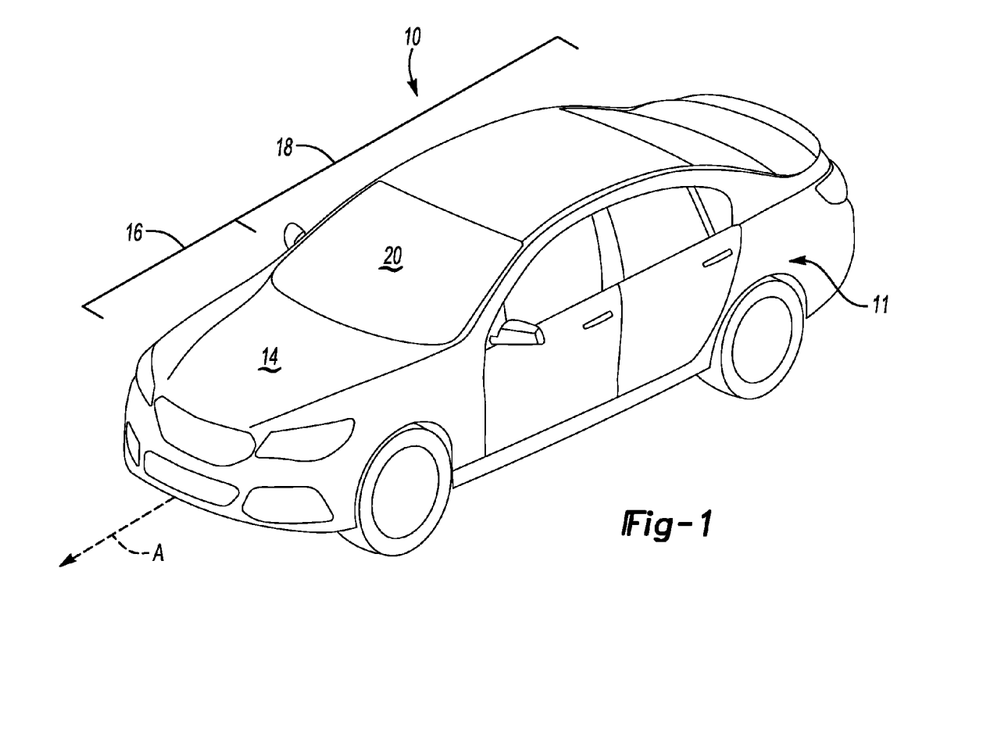
FIG. 1 is a schematic perspective view of an exemplary motor vehicle incorporating the energy-absorbing structure of the present invention as a motor vehicle hood.

Referring to the drawings, wherein like reference numerals correspond to like or similar components throughout the several figures, FIGS. 2-10 detail the energy-absorbing structure 14 disclosed herein. FIG. 1 is a perspective view of an exemplary motor vehicle, identified generally as 10, which employs the energy-absorbing structure 14 of the present invention as a motor vehicle hood assembly.

FIG. 1 is provided merely for explanatory purposes, representing an example application of the presently disclosed energy-absorbing structure 14 in a simplified illustration, the dimensions thereof exaggerated for clarity and for a better understanding of the present disclosure. The present disclosure is not limited to the particular structure or layout presented within FIG. 1. Correspondingly, although a vehicle 10 is depicted in FIG. 1 as a standard coupe-type passenger car, the presently disclosed energy-absorbing structure 14 is by no means limited to motor vehicle hood assemblies, as it may be employed as a stand-alone energy-absorbing structure 14 or as an energy-absorbing structure 14 utilized as a part of another structure within a variety of applications for example, aircraft applications, building construction applications, park or playground equipment, and other applications in which an energy-absorbing structure would be desirable. When embodied as a hood assembly for a motor vehicle 10 the energy-absorbing structure 14 of the present disclosure may be incorporated within any vehicle platform (e.g., sedan-type passenger cars, light trucks, heavy duty vehicles, buses, vans, coupe-type passenger car etc.).

As shown in FIG. 1, the energy-absorbing structure 14 may be incorporated within a motor vehicle 10. The motor vehicle 10 has a vehicle body 11 (also referred to herein as "vehicle structure") that includes the moveable or actuatable energy-absorbing structure 14 of the present invention provided as a vehicle hood assembly spanning or covering an engine compartment 16 forward of a passenger compartment 18. The energy-absorbing structure 14 or hood assembly is movably attached, coupled, secured, or mounted to the vehicle body 11, for example, by one or more peripheral hinges (not shown) positioned adjacent to a windshield 20. It is desirable that the energy-absorbing structure 14, when embodied as a hood assembly, is sufficiently sized and shaped to provide a closure panel suitable for substantially covering and protecting various vehicular components contained within the engine compartment 16, which may include, but are not limited to, propulsion system components, steering system components, braking system components, and heating, ventilation, and air conditioning (HVAC) system components. The term "engine" or "engine compartment" is not considered limiting with respect to the nature or type of propulsion system employed by the vehicle 10. Thus, the vehicle 10 may employ any propulsion system, such as a conventional internal combustion engine, an electric motor, a fuel cell, and/or a hybrid-electric system, etc.

The energy-absorbing structure 14, is designed to absorb and/or manage energy from external forces applied thereto by an external object or the like.

Figure 10:
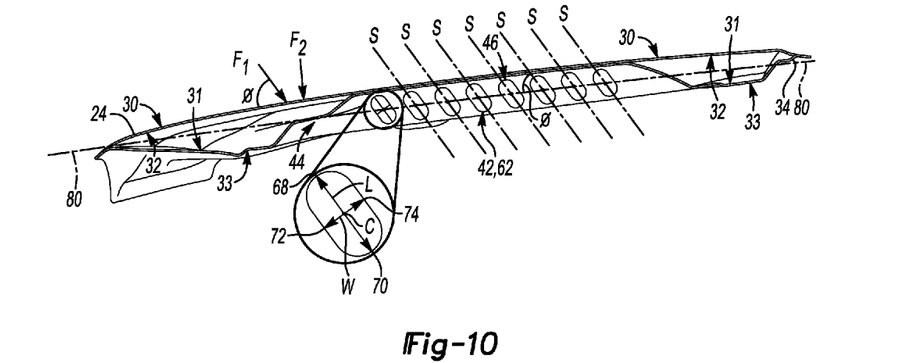
FIG. 10 is a schematic, cross-sectional view of the first embodiment of the example energy-absorbing structure of FIG. 2 taken along the section line 10-10.

As represented in FIG. 1, when embodied as a portion of a vehicle body 11, namely as a vehicle hood assembly, the energy-absorbing structure 14 can absorb energy from an external force applied to the vehicle body 11, for example $F_1$ and/or $F_2$ (shown in FIG. 10). The vehicle 10 may move or travel in a longitudinal direction of arrow A and may contact an object, positioned external to vehicle 10, in such a manner that the object impacts the energy-absorbing structure 14 embodied as the hood assembly in a substantially downward direction during contact therebetween, thereby subjecting the energy-absorbing structure 14 to various stresses, forces, and/or loads, i.e., $F_1$ and/or $F_2$ (Shown in FIG. 10). The energy-absorbing structure 14 has various characteristics, including, but not limited to, geometric characteristics and material characteristics, which may be manipulated to provide predetermined, substantially constant, and tunable performance for a given threshold load.

Figure 2:
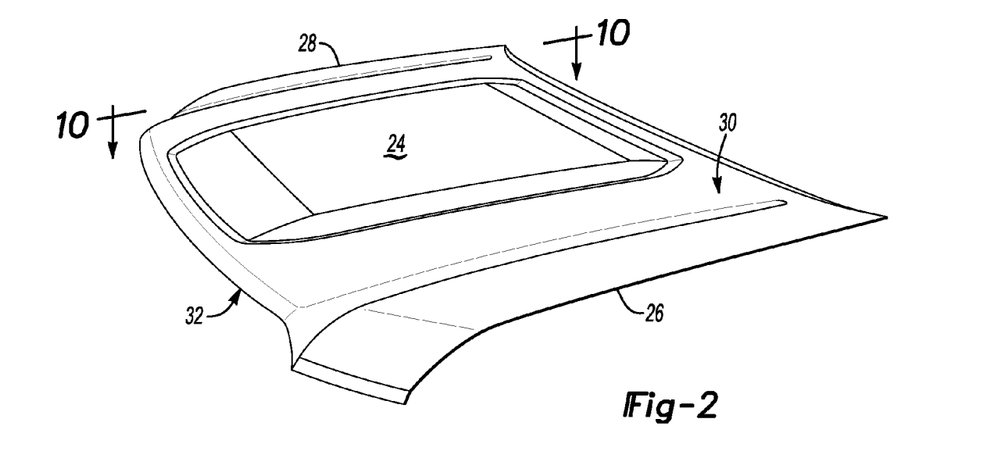
FIG. 2 is a schematic perspective view of a first panel member of an example energy-absorbing structure.

The energy-absorbing structure 14 of the present invention is detailed herein with respect to FIGS. 2-10. Referring to FIG. 2, the energy-absorbing structure 14 includes a first panel member 24. The first panel member 24 has a first panel first edge 26 and a first panel second edge 28, such that the first panel second edge 28 is disposed opposite the first panel first edge 26. The first panel member 24 may be formed and/or fabricated of a rigid material. The rigid material may be a polymeric material (plastic), a metallic material (steel, aluminum, and the like), or a combination thereof. In an example embodiment, wherein the energy-absorbing structure 14 is embodied as a vehicle hood, the first panel member 24 may be the outer-most member of the hood assembly. The first panel member 24 may additionally have a first outer surface 30 and a first inner surface 32 opposite the first outer surface 30. The first inner surface 32 faces toward the engine compartment 16 and the contents thereof. The first outer surface 30 faces away from the engine compartment 16 and the contents thereof. The first panel member 24 may be a one-piece structure, such as a monolithic plate, which may be pre-formed using methods such as stamping, hydroforming, quick plastic forming, or superplastic forming. The first panel member 24 may be drawn or otherwise individually contoured to meet predetermined packaging, design, and assembly restrictions. For instance, the first panel member 24 may be pre-formed with aesthetically pleasing contours.

Referring to FIGS. 3-7, the energy-absorbing structure 14 includes a second panel member 34. The second panel member 34 is substantially symmetrical about a longitudinal panel axis P. While only one side of the second panel member 34 is shown in FIGS. 3-6, it will be understood by one having ordinary skill in the art that the structure shown in FIGS. 3-6 is substantially symmetrical on both sides of the longitudinal panel axis P. As used herein, the terms "symmetric" and "symmetrical" should be defined or interpreted as identifying a component or element with a geometric profile that is substantially identical on both sides of a dividing centerline line or plane.

Figure 8:
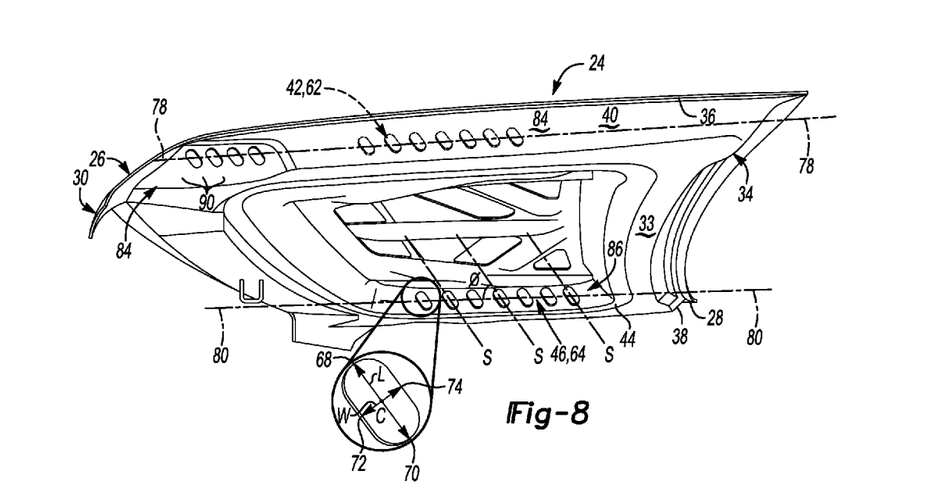
FIG. 8 is a first schematic perspective view of the first embodiment of the energy-absorbing structure.
Figure 9:
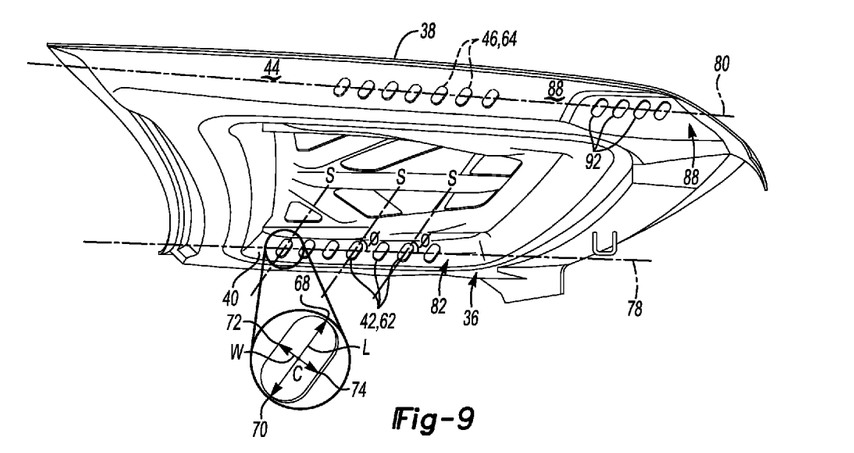
FIG. 9 is a second schematic perspective view of the first embodiment of the energy-absorbing structure.

The second panel member 34 has a second panel first edge 36 and a second panel second edge 38 (shown in FIGS. 8 and 9). The second panel second edge 38 is disposed opposite the second panel first edge 36. The second panel member 34 may be formed and/or fabricated of a rigid material. The rigid material may be a polymeric material (plastic), a metallic material (steel, aluminum, and the like), or a combination thereof. In an example embodiment wherein the energy-absorbing structure 14 is embodied as a vehicle hood, the second panel member 34 may be the inner-most member of the hood assembly nearest to the engine compartment 16 and the contents thereof. The second panel member 34 may additionally have a second outer surface 31 and a second inner surface 33 opposite the second outer surface 31.

The second panel member 34 is configured to be coupled with the first panel member 24 such that the second panel first edge 36 is aligned with the first panel first edge 26 and the second panel second edge 38 is aligned with the first panel second edge 28. The second inner surface 33 faces toward the engine compartment 16 and the contents thereof and the second outer surface 31 faces away from the engine compartment 16 and the contents thereof and faces toward the first inner surface 32 of the first panel member 24. The first panel member 24 and the second panel member 34 may be coupled via one or more substantially rigid connections. As used herein rigid connections may include, without limitation, fasteners, such as rivets or clinches, or welding such as spot welds.

Figure 3:
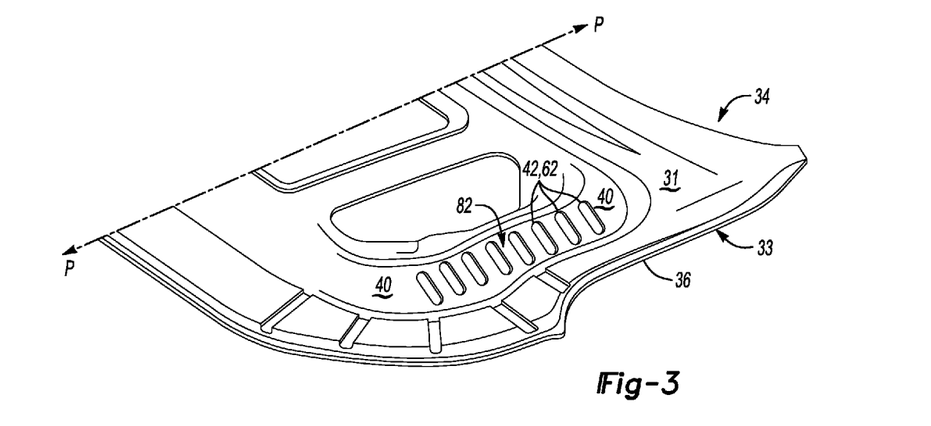
FIG. 3 is a schematic perspective fragmentary view of a first configuration of the second panel member of a first example embodiment of the example energy-absorbing structure.
Figure 4:
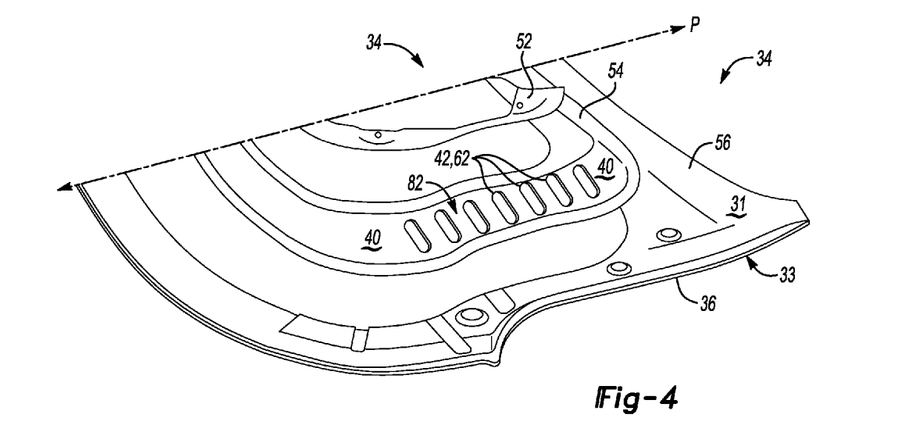
FIG. 4 is a schematic exploded perspective fragmentary view of a second configuration of the first example embodiment of the energy-absorbing structure.
Figure 5:
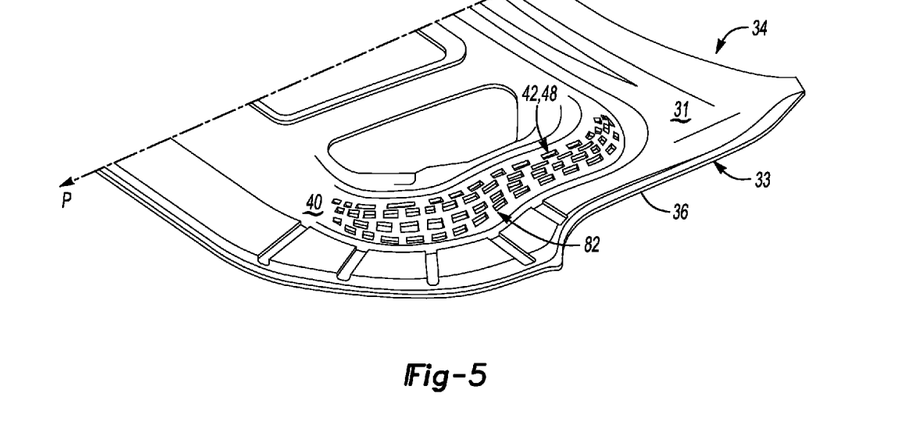
FIG. 5 is a schematic perspective fragmentary view of a first configuration of the second panel member of a second embodiment of the energy-absorbing structure.
Figure 6:
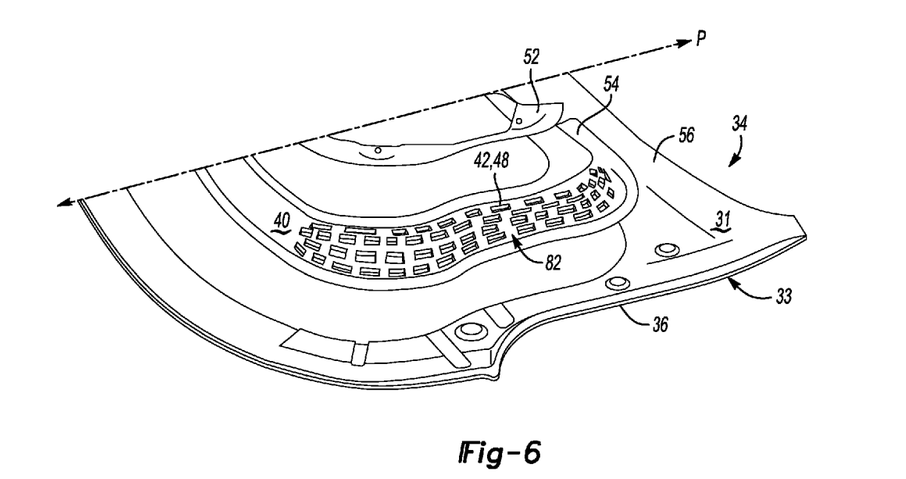
FIG. 6 is a schematic exploded perspective fragmentary view of the second configuration of the second panel member of the second embodiment of the energy-absorbing structure.

The second panel member 34 may be formed as a single unity piece, as shown in FIGS. 3 and 5, or as a plurality of second panel portions 52, 54, 56 as shown in FIGS. 4 and 6. In an example such as FIGS. 3 and 5, wherein the second panel member 34 is formed as a single unitary piece, the second panel member 34 may be formed using methods such as stamping, hydro forming, quick plastic forming, or superplastic forming, or another suitable formation process. In an example such as FIGS. 4 and 6, wherein the second panel member 34 is formed as a plurality of second panel portions 52, 54, 56, each of the second panel portions 52, 54, 56 may be independently formed using methods such as stamping, hydro forming, quick plastic forming, or superplastic forming, or another suitable formation process.

In an example such as FIGS. 4 and 6 wherein the second panel member 34 is formed of a plurality of second panel portions 52, 54, 56. The second panel member 34 may include an interior second panel portion 52, an intermediate second panel portion 54, and an outer second panel portion 56. The interior second panel portion 52, the intermediate second panel portion 54, and the outer second panel portion 56 may be coupled via a suitable metal coupling process. In such an example, a first deformable wall 40 and a second deformable wall 44 are defined by the intermediate second panel portion 54.

After initial formation or fabrication, the second panel member 34 may be drawn or otherwise individually contoured to meet predetermined design, packaging, and assembly restrictions. As such, the second panel member 34 is configured to define a first deformable wall 40 proximate to the second panel first edge 36. The first deformable wall 40 extends from the second panel first edge 36 and away from the first panel member 24 when the second panel member 34 is coupled therewith. The first deformable wall 40 defines a first plurality of apertures 42 therein. The second panel member 34 is further configured to define a second deformable wall 44 (shown in FIGS. 8, 9, and 10) proximate to the second panel second edge 38. The second deformable wall 44 extends from the second panel second edge 38 and away from the first panel member 24 when the second panel member 34 is coupled therewith. The second deformable wall 44 defines a second plurality of apertures 46 therein (also shown in FIGS. 8 and 9).

The first plurality of apertures 42 and the second plurality of apertures 46 may be formed within the second panel member 34 during initial formation. In the example embodiment shown in FIGS. 3 and 5, wherein the second panel member 34 is formed as a single unitary piece, the first plurality of apertures 42 and the second plurality of apertures 46 may be formed within and defined by the first and second deformable walls 40, 44 respectively via blanking or piercing of the second panel member 34. In the example embodiment shown in FIGS. 4 and 6, wherein the second panel member 34 is composed of an interior second panel portion 52, an intermediate second panel portion 54, and an outer second panel portion 56, the first plurality of apertures 42 and the second plurality of apertures 46 may be formed within and defined by the first and second deformable walls 40, 44 respectively via blanking or piercing of the intermediate second panel portion 54.

Alternatively, the first plurality of apertures 42 and the second plurality of apertures 46 may be formed within the second panel member 34 after initial formation. In the example embodiment shown in FIGS. 3 and 5, wherein the second panel member 34 is formed as a single unitary piece, the first plurality of apertures 42 and the second plurality of apertures 46 may be formed via laser trimming or water jet trimming of the second panel member 34 following the stamping of the second panel member 34. In the example embodiment shown in FIGS. 4 and 6, wherein the second panel member 34 is composed of an interior second panel portion 52, an intermediate second panel portion 54, and an outer second panel portion 56, the first plurality of apertures 42 and the second plurality of apertures 46 may be formed via laser trimming or water jet trimming of the intermediate second panel portion 54 following the stamping of the intermediate second panel portion 54.

Figure 7:
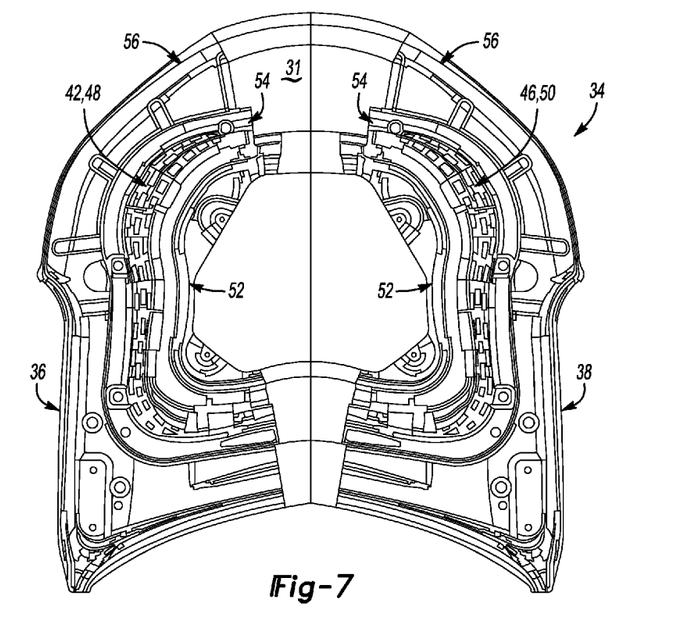
FIG. 7 is a schematic plan view of the second panel member of the second embodiment of the energy absorbing structure.

According to one example embodiment of the present invention, as shown in FIGS. 5, 6, and 7, the first plurality of apertures 42 may be defined as a first array of perforations 48. The second plurality of apertures 46 may be defined as a second array of perforations 50 (FIG. 7). The first array of perforations 48 and the second array of perforations 50 may vary therein with respect to the shape and size of each perforation. Each perforation of the first plurality of perforations 48 and the second plurality of perforations 50 varies in shape, such that each array may include but is not limited to perforations having a circular shape, an elliptical shape, a rectangular shape, a polygonal shape, etc.

The first array of perforations 48 may include a plurality of perforation rows and a plurality of perforation columns. The second array of perforations 50 may include a plurality of perforation rows and a plurality of perforation columns. The size and shape of each perforation individually, as well as the first array of perforations 48 and the second array of perforations 50 as a whole, may be customized to improve energy absorption while maintaining durability of the energy-absorbing structure 14. These perforations 48, 50 can be pierced prior to the second panel member 34 or the intermediate second panel portion 54 undergoing the drawing process, wherein the second panel member 34 or the intermediate second panel portion 54 is pulled or drawn into its desired shape.

Another example embodiment of the present invention, is shown in FIGS. 3, 4, 8, 9 and 10. The first deformable wall 40 may have an inwardly facing surface 82 and an outwardly facing surface 84. The first plurality of apertures 42 may be defined as a first plurality of slots 62 defined by the first deformable wall 40. The first plurality of slots 62 may be defined by and extend through the inwardly facing surface 82 of the first deformable wall 40. The second deformable wall 44 may have an inwardly facing surface 86 and an outwardly facing surface 88. The second plurality of apertures 46 may be defined as a second plurality of slots 64 defined by the second deformable wall 44. The second plurality of slots 64 may be defined by and extend through the inwardly facing surface 86 of the second deformable wall 44.

As further detailed in FIG. 8, the outwardly facing surface 84 of the first deformable wall 40 may define a third plurality of slots 90. As further detailed in FIG. 9, the outwardly facing surface 88 of the second deformable wall 44 may define a fourth plurality of slots 92.

Each slot of the first plurality of slots 62 has a first slot end 68 and a second slot end 70. The second slot end 70 is opposite the first slot end 68. Each slot of the first plurality of slots 62 defines a slot length L extending from the first slot end 68 to the second slot end 70. Each slot of the first plurality of slots 62 has a first slot side 72 and a second slot side 74. The respective second slot side 74 is opposite the respective first slot side 72. Each slot of the first plurality of slots 62 defines a slot width W extending between the first slot side 72 and the second slot side 74. Each slot of the first plurality of slots 62 has a slot center C, i.e., a center point, which is in the middle of the respective slot length L and slot width W.

The slot width W and the slot length L of each slot may be tuned depending on the structural characteristics of the vehicle 10 and the magnitude of the potential external force ($F_1$ and $F_2$ shown in FIG. 10) exerted on the energy-absorbing structure 14. In one example, each of the respective slots of the first plurality of slots 62 are equal in size and parallel in orientation with the other slots of the first plurality of slots 62, to achieve uniform deformation of the first deformable wall 40 when force is exerted upon the energy-absorbing structure 14. In one example, each respective slot is dimensioned such that the slot length L is approximately two times the slot width W.

Each slot of the second plurality of slots 64 has a first slot end 68 and a second slot end 70. The second slot end 70 is opposite the first slot end 68. Each slot of the second plurality of slots 64 defines a slot length L extending from the first slot end 68 to the second slot end 70. Each slot of the second plurality of slots 64 has a first slot side 72 and a second slot side 74. The respective second slot side 74 is opposite the respective first slot side 72. Each slot of the second plurality of slots 64 defines a slot width W extending between the first slot side 72 and the second slot side 74. Each slot of the second plurality of slots 64 has a slot center C, i.e., a center point, which is in the middle of the respective slot length L and slot width W.

The slot width W and the slot length L of each slot may be tuned depending on the structural characteristics of the vehicle 10 and the magnitude of the potential external force ($F_1$ and $F_2$ shown in FIG. 10) exerted on the energy absorbing structure 14. In one example, each of the respective slots of the second plurality of slots 64 are equal in size and parallel in orientation with the other slots of the second plurality of slots 64, to achieve uniform deformation of the second deformable wall 44 when force is exerted upon the energy-absorbing structure 14. In one example, each respective slot is dimensioned such that the slot length L is approximately two times the slot width W.

Each slot of the third plurality of slots 90 has a first slot end 68 and a second slot end 70. The second slot end 70 is opposite the first slot end 68. Each slot of the third plurality of slots 90 defines a slot length L extending from the first slot end 68 to the second slot end 70. Each slot of the third plurality of slots 90 has a first slot side 72 and a second slot side 74. The respective second slot side 74 is opposite the respective first slot side 72. Each slot of the third plurality of slots 90 defines a slot width W extending between the first slot side 72 and the second slot side 74. Each slot of the third plurality of slots 90 has a slot center C, i.e., a center point, which is in the middle of the respective slot length L and slot width W.

The slot width W and the slot length L of each slot may be tuned depending on the structural characteristics of the vehicle 10 and the magnitude of the potential external force ($F_1$ and $F_2$ shown in FIG. 10) exerted on the energy absorbing structure 14. In one example, each of the respective slots of the third plurality of slots 90 are equal in size and parallel in orientation with the other slots of the third plurality of slots 90 to achieve uniform deformation of the first deformable wall 40 when force is exerted upon the energy-absorbing structure 14. In one example, each respective slot is dimensioned such that the slot length L is approximately two times the slot width W.

Each slot of the fourth plurality of slots 92 has a first slot end 68 and a second slot end 70. The second slot end 70 is opposite the first slot end 68. Each slot of the fourth plurality of slots 92 defines a slot length L extending from the first slot end 68 to the second slot end 70. Each slot of the first plurality of slots 62 has a first slot side 72 and a second slot side 74. The respective second slot side 74 is opposite the respective first slot side 72. Each slot of the fourth plurality of slots 92 defines a slot width W extending between the first slot side 72 and the second slot side 74. Each slot of the fourth plurality of slots 92 has a slot center C, i.e., a center point, which is in the middle of the respective slot length L and slot width W.

The slot width W and the slot length L of each slot may be tuned depending on the structural characteristics of the vehicle 10 and the magnitude of the potential external force ($F_1$ and $F_2$ shown in FIG. 10) exerted on the energy absorbing structure 14. In one example, each of the respective slots of the fourth plurality of slots 92 are equal in size and parallel in orientation with the other slots of the fourth plurality of slots 92, to achieve uniform deformation of the second deformable wall 44 when force is exerted upon the energy-absorbing structure 14. In one example, each respective slot is dimensioned such that the slot length L is approximately two times the slot width W.

Referring to FIGS. 8-10, the first plurality of slots 62 and the third plurality of slots 90 are defined by the first deformable wall 40. The first plurality of slots 62 and the third plurality of slots 90 may be positioned along a first wall axis 78, such that the first wall axis 78 intersects each slot at its respective center point C. In one example, each slot of the first plurality of slots 62 is positioned substantially parallel with and equidistant from the other slots of the first plurality of slots 62 along the first wall axis 78 in order to facilitate uniform deformation of the first deformable wall 40. In one example, each slot of the third plurality of slots 90 is positioned substantially parallel with and equidistant from the other slots of the third plurality of slots 90 along the first wall axis 78, in order to facilitate uniform deformation of the first deformable wall 40.

However, the slots 62, 90 may be positioned in other configurations, such as a stepped configuration, in order to improve energy absorption and durability of the second panel member 34, such that the slots are arranged in order to maximize the deformation of the energy-absorbing structure 14 when the energy-absorbing structure 14 receives the slanted external force $F_1$ or the normal external force $F_2$ (FIG. 10). When the slanted external force $F_1$ or the normal external force $F_2$ are applied to the energy-absorbing structure 14, the deformation of the first deformable wall 40 should be maximized in order to allow the energy-absorbing structure 14 to absorb the maximum amount of energy from the slanted external force $F_1$ or the normal external force $F_2$.

The second plurality of slots 64 and the fourth plurality of slots 92 are defined by the second deformable wall 44. The second plurality of slots 64 and the fourth plurality of slots 92 may be positioned along a second wall axis 80, such that the second wall axis 80 intersects each slot at its respective center point C. In one example, each slot of the second plurality of slots 64 is positioned substantially parallel with and equidistant from the other slots of the second plurality of slots 64 along the second wall axis 80. In one example, the each slot of the fourth plurality of slots 92 is positioned substantially parallel with and equidistant from the other slots of the fourth plurality of slots 92 along the second wall axis 80.

However, the slots 64, 92 may be positioned in other configurations, such as a stepped configuration, in order to improve energy absorption and durability of the second panel member 34, such that the slots are arranged in order to maximize the deformation of the energy-absorbing structure 14 when the energy-absorbing structure 14 receives the slanted external force $F_1$ or the normal external force $F_2$ (FIG. 10). When the slanted external force $F_1$ or the normal external force $F_2$ are applied to the energy-absorbing structure 14, the deformation of the second deformable wall 44 should be maximized in order to allow the energy-absorbing structure 14 to absorb the maximum amount of energy from the slanted external force $F_1$ or the normal external force $F_2$.

Each respective slot of each of the first plurality of slots 62, the second plurality of slots 64, the third plurality of slots 90, and the fourth plurality of slots 92 has its own slot axis S. The first slot end 68, the slot center C, and second slot end 70 of each slot are positioned along the slot's respective slot axis S.

The slot axis S of each of the respective slots of the first plurality of slots 62 and the third plurality of slots 90 is parallel with the slot axis S of each of the other slots of the first plurality of slots 62 and the third plurality of slots 90. The slot axis S of each of the respective slots of the second plurality of slots 64 and the fourth plurality of slots 92 is parallel with the slot axis S of each of the other slots of the second plurality of slots 64 and the fourth plurality of slots 92.

The respective slot axis S of each respective slot of the first plurality of slots 62 and the third plurality of slots 90 is transverse to the first wall axis 78, such that the slot axis S of each slot of each of the first plurality of slots 62 and the third plurality of slots 90 is obliquely angled with respect to the first wall axis 78.

The respective slot axis S of each respective slot of the second plurality of slots 64 and the fourth plurality of slots 92 is transverse to the second wall axis 80, such that the slot axis S of each slot of each of the second plurality of slots 64 and the fourth plurality of slots 92 is obliquely angled with respect to the second wall axis 80.

As such, each slot of the first plurality of slots 62 is obliquely angled relative to the second panel first edge 36 of the second panel member 34; each slot of the second plurality of slots 64 is obliquely angled relative to the second panel second edge 38 of the second panel member 34; each slot of the third plurality of slots 90 is obliquely angled relative to the second panel first edge 36 of the second panel member 34; and each slot of the fourth plurality of slots 92 is obliquely angled relative to the second panel second edge 38 of the second panel member 34.

In one example, an oblique angle θ is defined between the first wall axis 78 and each of the slot axes S of the respective slots of the first plurality of slots 62 and the third plurality of slots 90. The oblique angle θ may range from thirty-three degrees to seventy-three degrees in order to maximize the deformation of the first deformable wall 40 when the energy-absorbing structure 14 receives slanted external force $F_1$. In the depicted embodiment, the slot axis S of each of the first plurality of slots 62 and the third plurality of slots 90 is positioned at approximately fifty-three degrees with respect to the first wall axis 78. Simply stated, in the depicted example oblique angle θ is fifty three degrees.

In one example, an oblique angle θ is defined between the second wall axis 80 and each of the slot axes S of the respective slots of the second plurality of slots 64 and the fourth plurality of slots 92. The oblique angle θ may range from thirty-three degrees to seventy-three degrees in order to maximize the deformation of the second deformable wall 44 when the energy-absorbing structure 14 receives slanted external force $F_1$. In the depicted embodiment, the slot axis S of each of the second plurality of slots 64 and the fourth plurality of slots 92 is positioned at approximately fifty-three degrees with respect to the second wall axis 80. Simply stated, in the depicted example oblique angle θ is fifty three degrees.

Referring back to FIG. 1, the energy-absorbing structure 14 may be incorporated within a motor vehicle 10. The motor vehicle 10 has a vehicle body 11 that includes the moveable or actuatable energy-absorbing structure 14 as a vehicle hood assembly movably attached, coupled, secured, or mounted to the vehicle body 11.

The energy-absorbing structure 14, is designed to absorb energy from external forces (depicted as example force $F_1$ and example force $F_2$ in FIG. 10) applied thereto by an external object. The energy-absorbing structure 14 embodied as a vehicle hood can absorb energy from an external force, such as $F_1$ and $F_2$, applied to the vehicle body 11, as a result of contact with an object positioned external to vehicle 10, while the vehicle 10 is stationary or while the vehicle 10 moves or travels in a longitudinal direction of arrow A (FIG. 1). In such an instance the object may impact the vehicle 10 at the energy-absorbing structure 14 in a substantially downward direction as shown by example forces $F_1$ and $F_2$ (shown in FIG. 10), thereby subjecting the energy-absorbing structure 14 to various stresses, forces, and/or loads.

In such an instance, the energy-absorbing structure 14 or vehicle hood assembly employs the plurality of apertures 48, 62, 90 in the first deformable wall 40 and the plurality of apertures 50, 64, 92 defined by the second deformable wall 44 to improve energy absorption and durability of the second panel member 34. The apertures 48, 50, 62, 64, 90, 92 are arranged in order to maximize the deformation of the energy-absorbing structure 14 when the energy-absorbing structure 14 receives the slanted external force $F_1$ or the normal external force $F_2$. Specifically, when the slanted external force $F_1$ and/or the normal external force $F_2$ are applied to the energy-absorbing structure 14, the deformable walls 40, 44 are configured to deform around the respective slots 62, 64, 90, 92. More specifically, when the energy absorbing-structure 14 receives the slanted external force $F_1$ and/or the normal external force $F_2$, the slots 62, 64, 90, 92 may change in size (e.g., expand) in order to allow the deformable walls 40, 44 to deform and absorb energy. Accordingly, the stress concentrates near the slots 62, 64, 90, 92 when the slanted external force $F_1$ and/or the normal force $F_2$ are applied to the energy-absorbing structure 14. The deformation of the deformable walls 40, 44 prevents, or at least, inhibits, force transfer to the other parts of the attached structure, i.e., the vehicle body 11 (FIG. 1). As such, when the slanted external force $F_1$ or the normal external force $F_2$ are applied to the energy-absorbing structure 14, the deformation of the first deformable wall 40 and the second deformable wall 44 are maximized in order to allow the energy-absorbing structure 14 to absorb the maximum amount of energy from the slanted external force $F_1$ or the normal external force $F_2$.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An energy-absorbing structure comprising:
   a first panel member having a first panel first edge and a first panel second edge opposite the first panel first edge;
   a second panel member having a second panel first edge and a second panel second edge opposite the second panel first edge, wherein the second panel member is configured to be coupled with the first panel member such that the second panel first edge is aligned with the first panel first edge and the second panel second edge is aligned with the first panel second edge;
   wherein the second panel member defines a first deformable wall extending distally from the second panel first edge and away from the first panel member and a second deformable wall extending distally from the second panel second edge and away from the first panel member, and wherein each of the first deformable wall and the second deformable wall has an inwardly facing surface and an outwardly facing surface;
   wherein the first deformable wall defines a first plurality of slots therein that are each defined by and extend through the inwardly facing surface of the first deformable wall and a third plurality of slots therein that are each defined by the outwardly facing surface of the first deformable wall; and wherein the second deformable wall defines a second plurality of slots therein that are defined by and extend through the inwardly facing surface of the second deformable wall and a fourth plurality of slots that are each defined by the outwardly facing surface of the second deformable wall; and wherein each of the slots of the first plurality of slots and the third plurality of slots is obliquely angled relative to the second panel first edge, and each of the slots of the second plurality of slots and fourth plurality of slots is obliquely angled relative to the second panel second edge.

2. The energy-absorbing structure of claim 1 wherein each of the slots are equal in size, and wherein each slot of the first plurality of slots is positioned equidistant from the other slots of the first plurality of slots, each slot of the second plurality of slots is positioned equidistant from the other slots of the second plurality of slots, each slot of the third plurality of slots is positioned equidistant from the other slots of the third plurality of slots, and each slot of the fourth plurality of slots is positioned equidistant from the other slots of the fourth plurality of slots.

3. The energy-absorbing structure of claim 1 wherein each slot has a respective slot axis.

4. The energy-absorbing structure of claim 3 wherein each slot includes:
   a first slot end and a second slot end opposite the first slot end, such that a slot length is defined between the first slot end and the second slot end;
   a first slot side and a second slot side opposite the first slot side, such that a slot width is defined between the first slot side and the second slot side; and
   wherein the first slot end and second slot end of each slot are positioned along the respective slot axis.

5. The energy-absorbing structure of claim 4 wherein the slot length is approximately two times the slot width.

6. The energy-absorbing structure of claim 4 wherein each slot further includes:
   a slot center equidistant from the respective first slot end, the second slot end, the first slot side, and the second slot side;
   wherein the first plurality of slots is positioned along a first wall axis, such that the slot center of each slot of the first plurality of slots is positioned on the first wall axis;
   wherein the second plurality of slots is positioned along a second wall axis, such that the slot center of each slot of the second plurality of slots is positioned on the second wall axis;
   wherein the third plurality of slots is positioned along a first wall axis, such that the slot center of each slot of the first plurality of slots is positioned on the first wall axis; and
   wherein the fourth plurality of slots is positioned along a second wall axis, such that the slot center of each slot of the second plurality of slots is positioned on the second wall axis.

7. The energy-absorbing structure of claim 6 wherein the respective slot axis of each respective slot of the first plurality of slots and the third plurality of slots is transverse to the first wall axis such that each slot axis is positioned at approximately 53 degrees with respect to the first wall axis, and wherein the slot axis of each respective slot of the second plurality of slots and the fourth plurality of slots is transverse to the second wall axis such that each slot axis is positioned at approximately 53 degrees with respect to the second wall axis.

8. A vehicle comprising:
   a vehicle body;
   a hood assembly movably coupled to the vehicle body, the hood assembly including:
      a first panel member having a first panel first edge and a first panel second edge opposite the first panel first edge;
      a second panel member having a second panel first edge and a second panel second edge opposite the second panel first edge, wherein the second panel member is coupled with the first panel member such that the second panel first edge is aligned with the first panel first edge and the second panel second edge is aligned with the first panel second edge;
   wherein the second panel member defines a first deformable wall extending distally from the second panel first edge and away from the first panel member and a second deformable wall extending distally from the second panel second edge and away from the first panel member, and wherein each of the first deformable wall and the second deformable wall has an inwardly facing surface and an outwardly facing surface, such that each of the first deformable wall and the second deformable wall are configured to manage energy applied to the hood assembly by an external force; wherein the first deformable wall defines a first plurality of slots therein that are each defined by and extend through the inwardly facing surface of the first deformable wall and a third plurality of slots that are each defined by the outwardly facing surface of the first deformable wall; and
   wherein the second deformable wall defines a second plurality of slots therein that are defined by and extend through the inwardly facing surface of the second deformable wall and a fourth plurality of slots that are each defined by the outwardly facing surface of the second deformable wall; and
   wherein each of the slots of the first plurality of slots and the third plurality of slots is obliquely angled relative to the second panel first edge, and each of the slots of the second plurality of slots and fourth plurality of slots is obliquely angled relative to the second panel second edge.

9. The vehicle of claim 8 wherein each slot of the first plurality of slots, the second plurality of slots, the third plurality of slots, and the fourth plurality of slots has a respective slot axis.

10. The vehicle of claim 9 wherein each slot of the first plurality of slots, the second plurality of slots, the third plurality of slots, and the fourth plurality of slots includes:
   a first slot end and a second slot end opposite the first slot end, such that a slot length is defined between the first slot end and the second slot end and extends therebetween, wherein the first slot end and second slot end of each slot are positioned along the respective slot axis;
   a first slot side and a second slot side opposite the first slot side, such that a slot width is defined between the first slot side and the second slot side and extends therebetween;
   a slot center equidistant from the respective first slot end, the second slot end, the first slot side, and the second slot side;
   wherein the slot length is approximately two times the slot width;

wherein the first plurality of slots and the third plurality of slots are positioned along a first wall axis, such that the slot center of each slot of the first plurality of slots and third plurality of slots is positioned on the first wall axis; and wherein the second plurality of slots and the fourth plurality of slots are positioned along a second wall axis, such that the slot center of each slot of the second plurality of slots and the fourth plurality of slots is positioned on the second wall axis.

11. The vehicle of claim 10 wherein:

the slot axis of each respective slot of the first plurality of slots is transverse and obliquely angled with respect to the first wall axis, such that the respective slot axis of each slot of the first plurality of slots is positioned at approximately 53 degrees with respect to the first wall axis;

the slot axis of each respective slot of the second plurality of slots is transverse and obliquely angled with respect to the second wall axis, such that the respective slot axis of each slot of the second plurality of slots is positioned at approximately 53 degrees with respect to the second wall axis;

the slot axis of each respective slot of the third plurality of slots is transverse and obliquely angled with respect to the first wall axis, such that the respective slot axis of each slot of the third plurality of slots is positioned at approximately 53 degrees with respect to the first wall axis; and the slot axis of each respective slot of the fourth plurality of slots is transverse and obliquely angled with respect to the second wall axis, such that the respective slot axis of each slot of the fourth plurality of slots is positioned at approximately 53 degrees with respect to the second wall axis.

\* \* \* \* \*